United States Patent
Nakahara

(10) Patent No.: US 10,754,131 B2
(45) Date of Patent: Aug. 25, 2020

(54) ZOOM LENS AND IMAGE PICKUP APPARATUS

(71) Applicant: CANON KABUSHIKI KAISHA, Tokyo (JP)

(72) Inventor: Makoto Nakahara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 16/194,860

(22) Filed: Nov. 19, 2018

(65) Prior Publication Data

US 2019/0162940 A1   May 30, 2019

(30) Foreign Application Priority Data

Nov. 24, 2017  (JP) .................................. 2017-225560

(51) Int. Cl.
*G02B 15/20* (2006.01)
*G02B 13/02* (2006.01)
*G02B 15/14* (2006.01)

(52) U.S. Cl.
CPC ............. *G02B 15/20* (2013.01); *G02B 13/02* (2013.01); *G02B 15/144105* (2019.08)

(58) Field of Classification Search
CPC ............ G02B 15/20; G02B 15/144105; G02B 13/02; G02B 13/18
See application file for complete search history.

(56) References Cited

U.S. PATENT DOCUMENTS

| | | | |
|---|---|---|---|
| 6,226,122 B1 * | 5/2001 | Sugawara | G02B 13/02 359/407 |
| 9,219,864 B2 | 12/2015 | Nakahara | |
| 9,377,606 B2 | 6/2016 | Nakahara | |
| 9,500,842 B2 | 11/2016 | Nakahara | |
| 2011/0267708 A1 | 11/2011 | Kon | |
| 2014/0029111 A1 | 1/2014 | Shibata | |
| 2017/0131620 A1 | 5/2017 | Nakahara | |
| 2019/0041605 A1 | 2/2019 | Saito et al. | |
| 2019/0041606 A1 | 2/2019 | Saito et al. | |

FOREIGN PATENT DOCUMENTS

| | | |
|---|---|---|
| JP | H10268195 A | 10/1998 |
| JP | 2004258240 A | 9/2004 |
| JP | 2011232624 A | 11/2011 |
| JP | 2012141598 A | 7/2012 |

\* cited by examiner

*Primary Examiner* — Wen Huang
(74) *Attorney, Agent, or Firm* — Carter, DeLuca & Farrell LLP

(57) ABSTRACT

Provided is a zoom lens including, in order from an object side to an image side: a first lens unit having a positive refractive power; a second lens unit having a negative refractive power; and a third lens unit having a positive refractive power, in which an interval between each pair of adjacent lens units is changed during zooming, the first lens unit consists of, in order from the object side to the image side, a positive lens and a negative lens, and a focal length of the first lens unit, a focal length of the third lens unit, a focal length of the negative lens, and a focal length of an entire system of the zoom lens at a wide-angle end are each appropriately set.

16 Claims, 7 Drawing Sheets

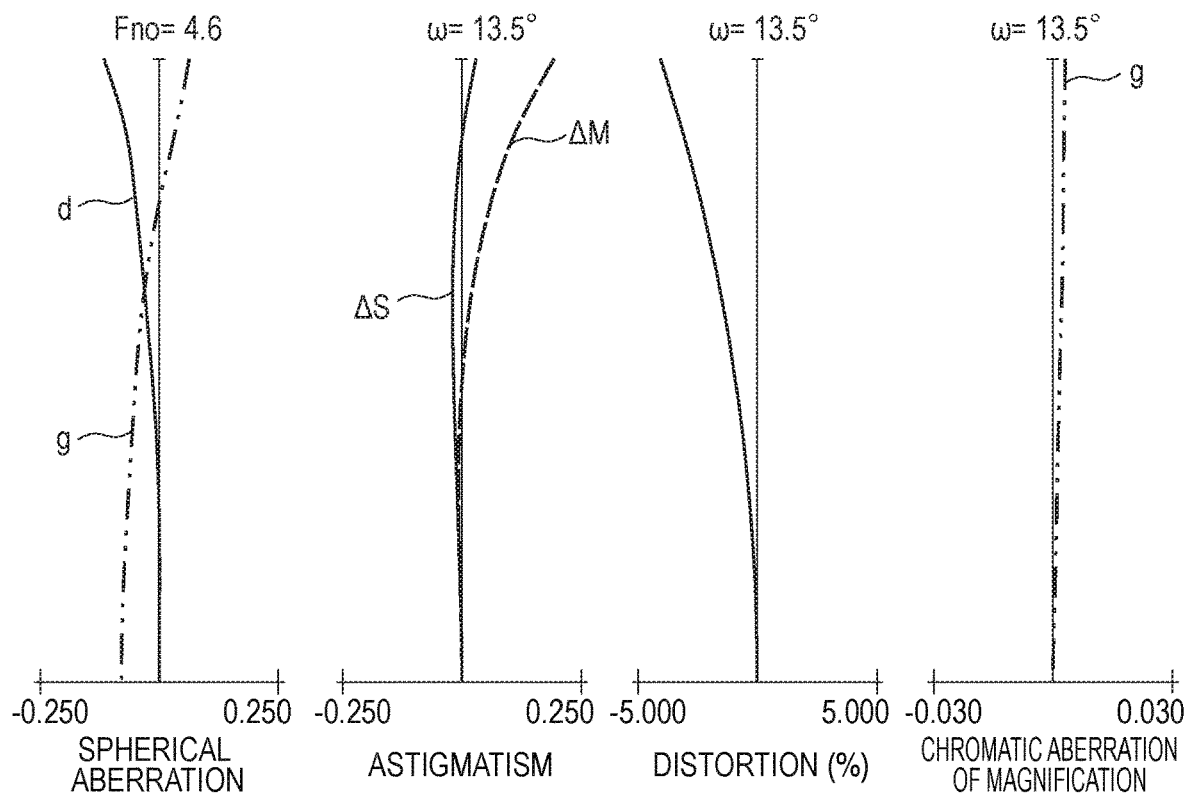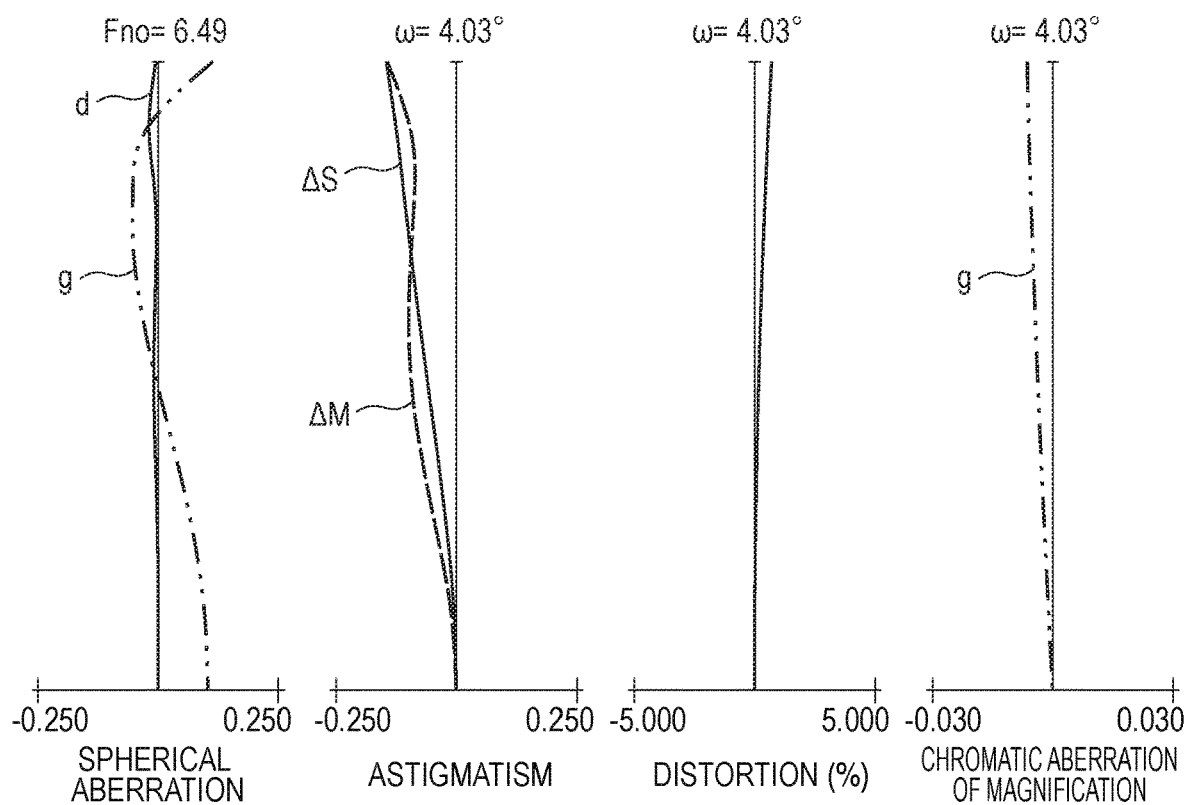

ZOOM LENS AND IMAGE PICKUP APPARATUS

BACKGROUND OF THE INVENTION

Field of the Invention

The present invention relates to a zoom lens.

Description of the Related Art

In recent years, it is required of an image pickup optical system used with an image pickup apparatus to be a zoom lens that is compact with a short total lens length and has a high zoom ratio and high performance (high resolution) over an entire zoom range, for example.

Moreover, it is also required of the image pickup optical system to be a telephoto zoom lens having a long focal length, which facilitates taking an image of an object at a distance, for example. As a zoom lens that satisfies those requirements, there has been known a telephoto zoom lens of positive lead type, in which a lens unit having a positive refractive power is arranged closest to an object side (US Patent Application Publication No. 2011/0267708).

In US Patent Application Publication No. 2011/0267708, there is disclosed a zoom lens consisting of, in order from an object side to an image side: a first lens unit having a positive refractive power; a second lens unit having a negative refractive power; a third lens unit having a positive refractive power; and a fourth lens unit having a negative refractive power.

In recent years, it is strongly required of a zoom lens used with an image pickup apparatus to be compact as an entire system of the zoom lens and have a high zoom ratio and high resolution over an entire zoom range. In the above-mentioned zoom lens of positive lead type, an effective diameter of the first lens unit closest to the object side is often equal to or more than an axial beam diameter, which is determined by an f-number (Fno) at a telephoto end. Therefore, a weight of the first lens unit tends to be heavy. In addition, at the first lens unit, a height of incidence of an axial beam at the telephoto end is high, and hence there has been a tendency for the first lens unit to generate large amounts of spherical aberration, comatic aberration, and other various aberrations.

In particular, in a telephoto zoom lens, aberrations generated by a front lens unit are enlarged by a rear lens unit.

Therefore, in a zoom lens of positive lead type, in order to obtain high optical performance over the entire zoom range while reducing a total lens length and downsizing an entire system of the zoom lens, it is important to appropriately set a zoom type (number of lens units and signs of refractive powers of respective lens units). It is particularly important to appropriately set a lens configuration of a first lens unit.

SUMMARY OF THE INVENTION

According to one embodiment of the present invention, there is provided a zoom lens including, in order from an object side to an image side: a first lens unit having a positive refractive power; a second lens unit having a negative refractive power; and a third lens unit having a positive refractive power, in which an interval between each pair of adjacent lens units is changed during zooming, in which the first lens unit consists of a positive lens and a negative lens arranged on the image side of the positive lens, in which the following conditional expressions are satisfied:

$$5.0 < f1/f3 < 12.0; \text{ and}$$

$$-14.0 < fG2/fw < -3.0,$$

where f1 represents a focal length of the first lens unit, f3 represents a focal length of the third lens unit, fG2 represents a focal length of the negative lens, and fw represents a focal length of an entire system of the zoom lens at a wide-angle end.

Further features of the present invention will become apparent from the following description of exemplary embodiments with reference to the attached drawings.

BRIEF DESCRIPTION OF THE DRAWINGS

FIG. 2A is an aberration diagram in Numerical Embodiment 1 at a wide-angle end.

FIG. 2B is an aberration diagram in Numerical Embodiment 1 at a telephoto end.

DESCRIPTION OF THE EMBODIMENTS

Now, exemplary embodiments of the present invention are described with reference to the attached drawings. A zoom lens according to each of Embodiments of the present invention includes, in order from an object side to an image side: a first lens unit having a positive refractive power; a second lens unit having a negative refractive power; and a third lens unit having a positive refractive power. An interval between each pair of adjacent lens units is changed during zooming.

Figure 1:
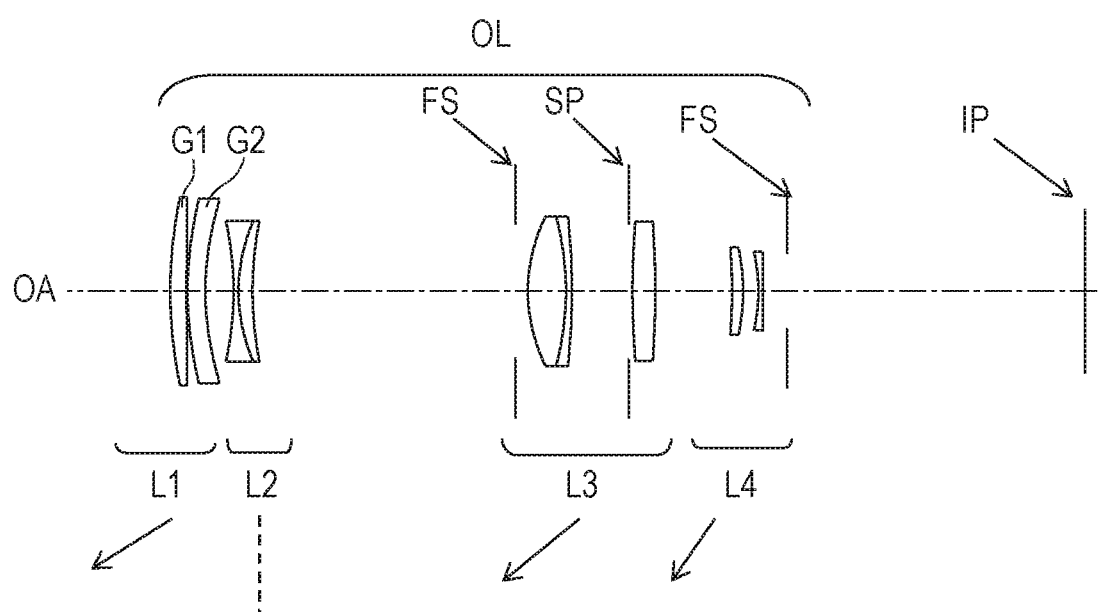
FIG. 1 is a cross-sectional view of a zoom lens according to Embodiment 1 (Numerical Embodiment 1) of the present invention.
Figure 3:
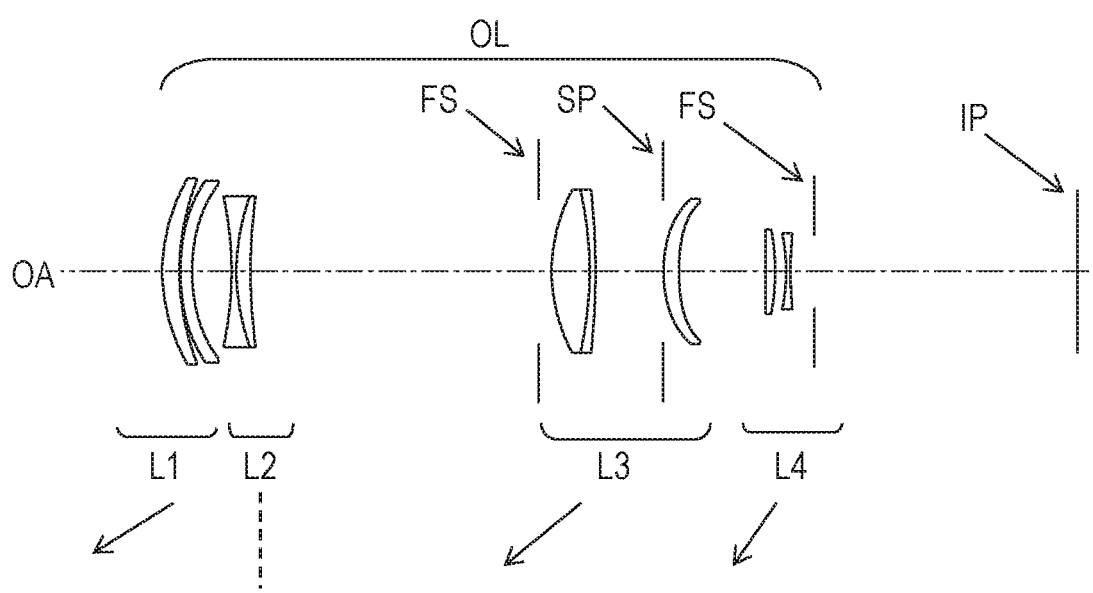
FIG. 3 is a cross-sectional view of a zoom lens according to Embodiment 2 (Numerical Embodiment 2) of the present invention.
Figure 4A:
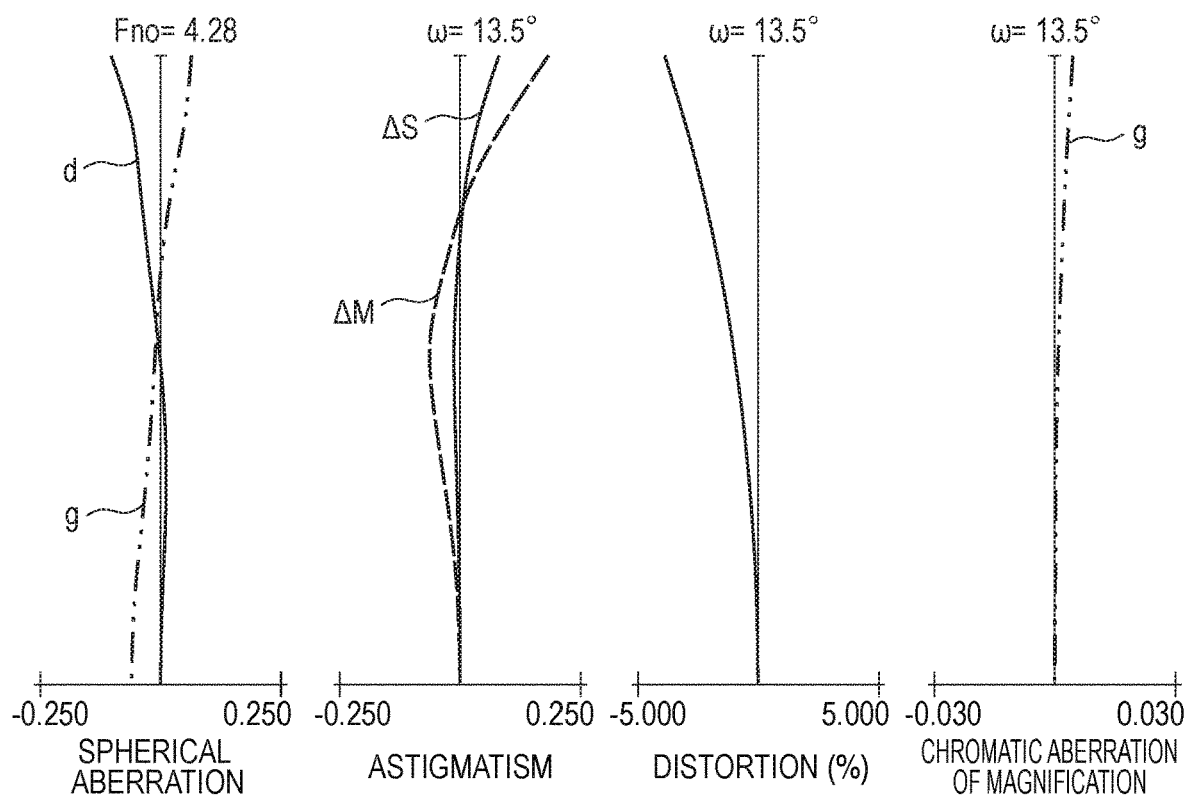
FIG. 4A is an aberration diagram in Numerical Embodiment 2 at a wide-angle end.
Figure 4B:
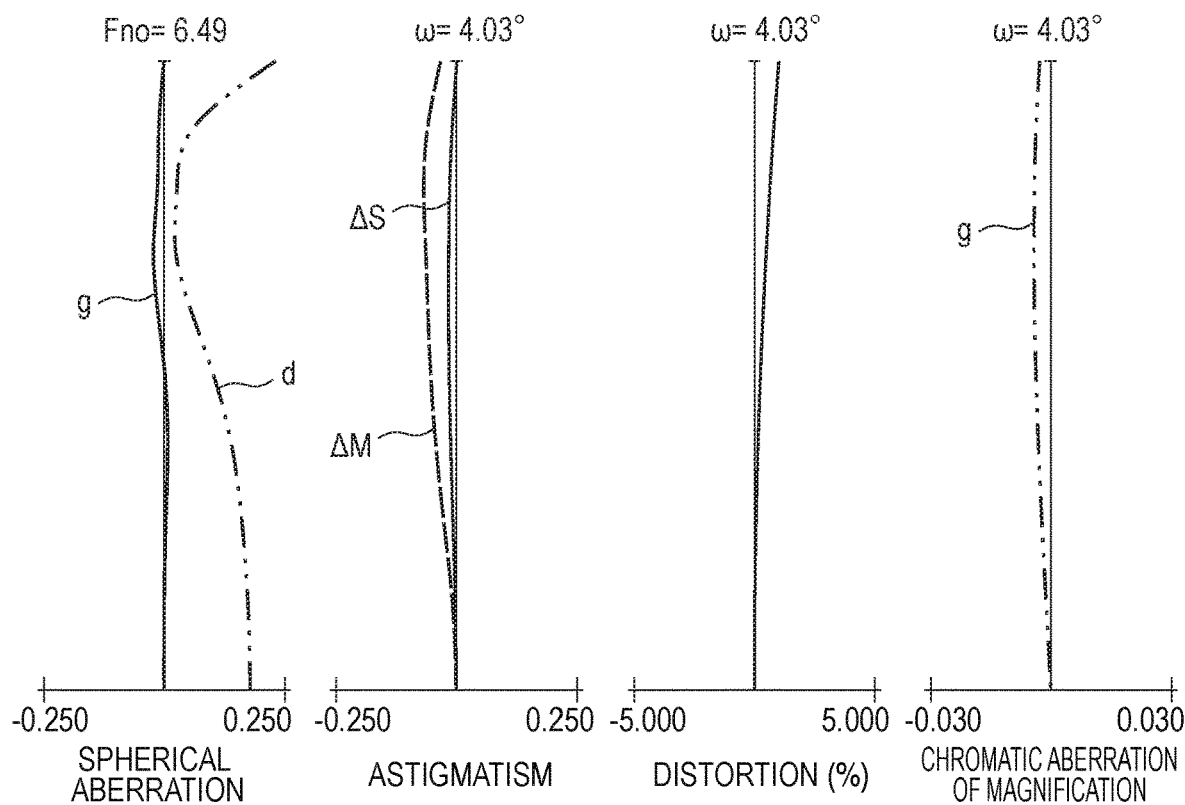
FIG. 4B is an aberration diagram in Numerical Embodiment 2 at a telephoto end.

FIG. 1 is a lens cross-sectional view of a zoom lens according to Embodiment 1 of the present invention at a wide-angle end (short focal length end). FIG. 2A is an aberration diagram of the zoom lens according to Embodiment 1 at the wide-angle end, and FIG. 2B is an aberration diagram of the zoom lens according to Embodiment 1 at a telephoto end (long focal length end). The zoom lens of Embodiment 1 has a zoom ratio of 3.42, and an aperture ratio (f-number) of from 4.60 to 6.49. FIG. 3 is a lens cross-sectional view of a zoom lens according to Embodiment 2 of the present invention at a wide-angle end. FIG. 4A is an aberration diagram of the zoom lens according to Embodiment 2 at the wide-angle end, and FIG. 4B is an aberration diagram according to Embodiment 2 of the zoom lens at a telephoto end. The zoom lens of Embodiment 2 has a zoom ratio of 3.41, and an aperture ratio of from 4.28 to 6.49.

Figure 5:
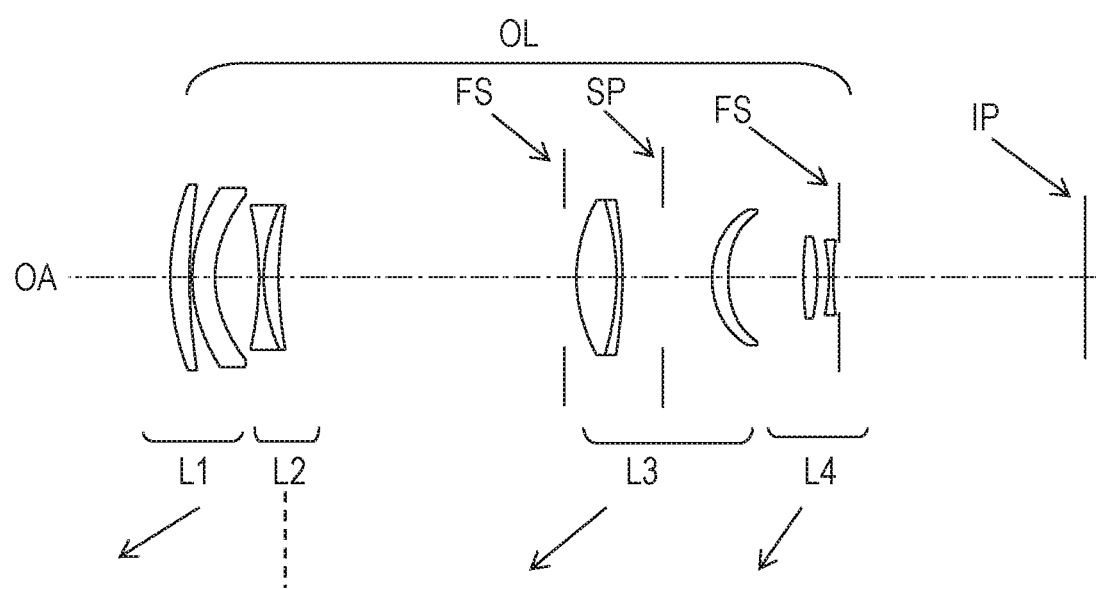
FIG. 5 is a cross-sectional view of a zoom lens according to Embodiment 3 (Numerical Embodiment 3) of the present invention.
Figure 6A:
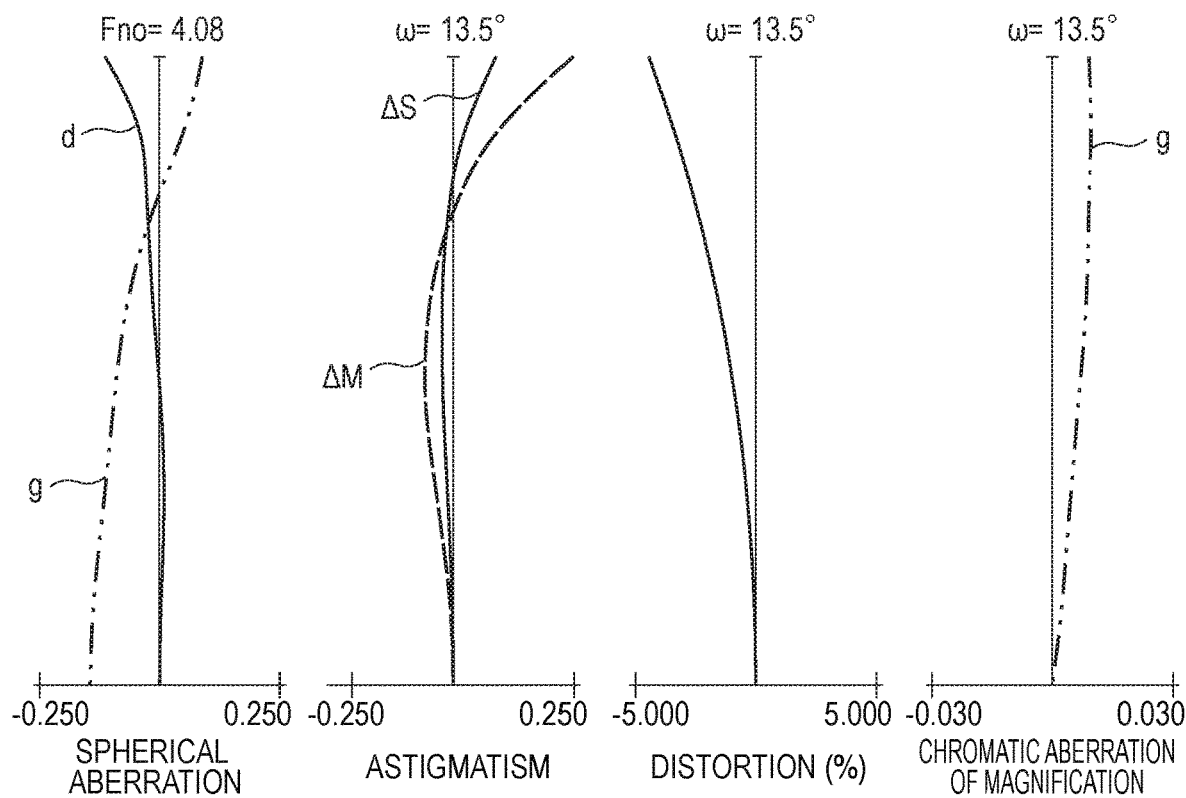
FIG. 6A is an aberration diagram in Numerical Embodiment 3 at a wide-angle end.
Figure 6B:
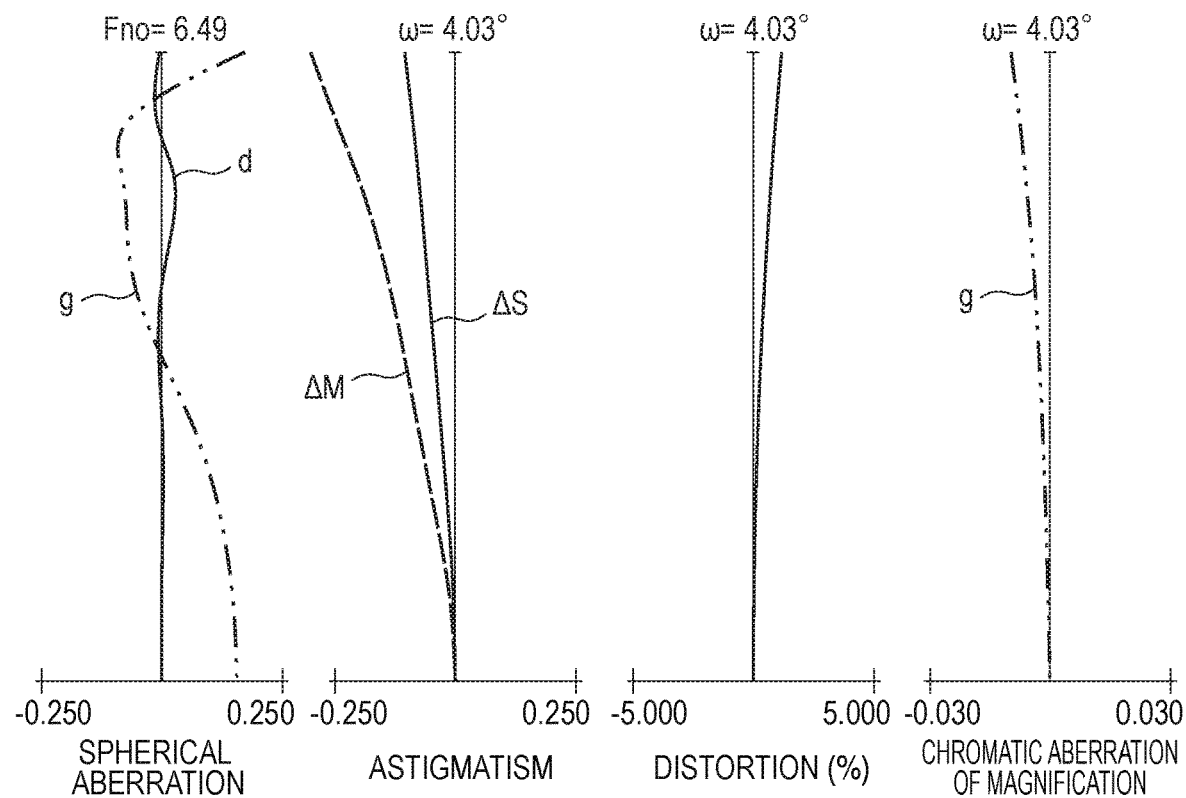
FIG. 6B is an aberration diagram in Numerical Embodiment 3 at a telephoto end.
Figure 7:
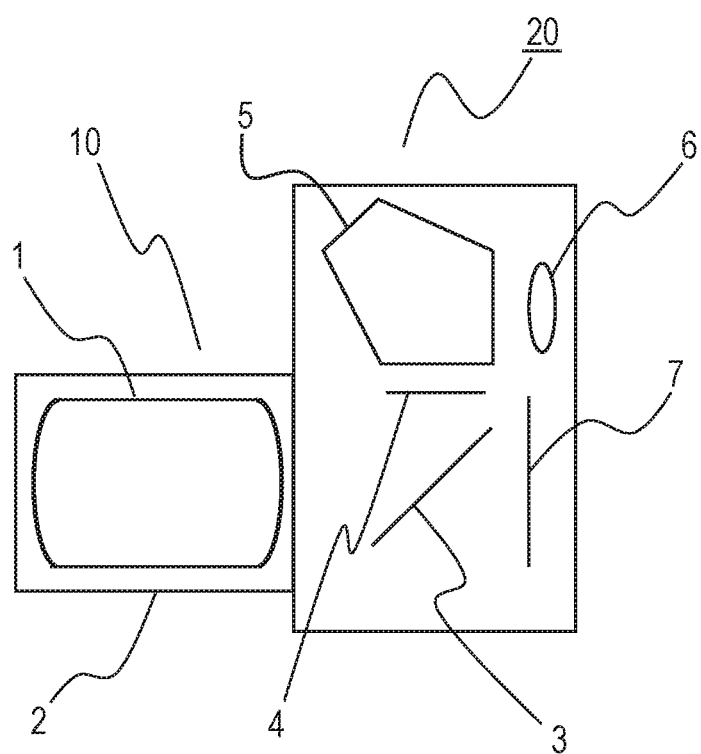
FIG. 7 is a schematic diagram of a main part of an image pickup apparatus according to an Embodiment of the present invention.

FIG. 5 is a lens cross-sectional view of a zoom lens according to Embodiment 3 of the present invention at a wide-angle end. FIG. 6A is an aberration diagram of the zoom lens according to Embodiment 3 at the wide-angle end, and FIG. 6B is an aberration diagram of the zoom lens according to Embodiment 3 at a telephoto end. The zoom lens of Embodiment 3 has a zoom ratio of 3.41, and an aperture ratio of from 4.08 to 6.49. FIG. 7 is a schematic diagram of a main part of a digital still camera (image pickup apparatus) including the zoom lens.

In the lens cross-sectional views, the left side is an object side (front side), and the right side is an image side (rear side). In the lens cross-sectional views, OL represents a zoom lens. A variable "i" represents the order of each lens unit from the object side to the image side, and Li represents the i-th lens unit. SP represents an f-number determining member (hereinafter referred to as "aperture stop"), which serves as an aperture stop configured to determine (constrict) a light flux of a minimum f-number. FS represents a flare cut stop, which is configured to cut flare light. OA represents an optical axis.

IP represents an image plane. When the zoom lens is used as an image pickup optical system of a video camera or a digital still camera, an image pickup plane of an image pickup element (photoelectric conversion element), such as a CCD sensor or a CMOS sensor, is arranged. In the spherical aberration diagrams, the solid line "d" indicates the d-line (at a wavelength of 587.6 nm), and the two-dot chain line "g" indicates the g-line (at a wavelength of 435.8 nm). In the astigmatism diagrams, ΔM indicates a meridional image plane, and ΔS indicates a sagittal image plane. Distortion indicates distortion with respect to the d-line. In addition, the chromatic aberration of magnification indicates a difference of the g-line with reference to the d-line.

Fno represents an f-number. A symbol ω represents an image pickup half angle of view (degrees). In the following Embodiments, the wide-angle end and the telephoto end are zoom positions at the time when a magnification-varying lens unit is located at each end of a mechanically movable range on the optical axis. In the lens cross-sectional views, the arrow indicates a movement locus of each lens unit for zooming from the wide-angle end to the telephoto end.

A zoom lens according to each of Embodiments of the present invention includes, in order from the object side to the image side: a first lens unit L1 having a positive refractive power; a second lens unit L2 having a negative refractive power; and a third lens unit L3 having a positive refractive power. An interval between each pair of adjacent lens units is changed.

In a telephoto zoom lens, the first lens unit L1, which is closest to the object side, generally has an outside diameter that is equal to or more than an outside diameter of an axial beam, which is determined by an f-number (Fno) at a telephoto end. Thus, the first lens unit L1 tends to have a heavy weight. Therefore, in the zoom lens according to each of Embodiments, the first lens unit L1 consists of, in order from the object side to the image side, a positive lens G1 and a negative lens G2 to reduce the weight while satisfactorily correcting spherical aberration and comatic aberration.

In order to reduce the weight of the first lens unit L1, it is preferred to use a resin material for the negative lens G2 included in the first lens unit L1.

In general, when a resin material is used, a focus is easily shifted when a temperature is changed. The negative lens G2 included in the first lens unit L1 of the telephoto zoom lens according to each of Embodiments has a relatively weak refractive power and is strong against environmental changes. Moreover, in the first lens unit L1, the positive lens G1 and the negative lens G2 are arranged in the stated order from the object side such that the resin material is not directly touched, to thereby avoid a scratch and other damage.

A low-dispersion material is used for the positive lens G1 to satisfactorily correct axial chromatic aberration and chromatic aberration of magnification at the telephoto end. Moreover, the negative lens G2 included in the first lens unit L1 has an aspherical surface as at least one of a lens surface on the object side or a lens surface on the image side thereof to satisfactorily correct spherical aberration, comatic aberration, and other various aberrations generated by the positive lens G1.

In order to reduce the weight of the entire zoom lens, the second lens unit L2 having the negative refractive power consists of at most two lenses, and the third lens unit having the positive refractive power consists of at most three lenses. Moreover, at least one lens of the third lens unit L3 has an aspherical surface as at least one of a lens surface on the object side or a lens surface on the image side thereof to satisfactorily correct spherical aberration, comatic aberration, and other various aberrations generated by the third lens unit L3.

In each of Embodiments, the zoom lens includes a fourth lens unit L4 having a negative refractive power, which is arranged adjacent to the third lens unit L3 on the image side of the third lens unit L3.

The third lens unit L3 includes the aperture stop SP, which is configured to move integrally (along the same locus) with the third lens unit L3 during zooming.

The zoom lens according to each of Embodiments consists of, in order from the object side to the image side: the first lens unit L1 having the positive refractive power; the second lens unit L2 having the negative refractive power; the third lens unit L3 having the positive refractive power; and the fourth lens unit L4 having the negative refractive power. The first lens unit L1, the third lens unit L3, and the fourth lens unit L4 are configured to move toward the object side during zooming from the wide-angle end to the telephoto end, and the second lens unit L2 is configured not to move during zooming.

In each of Embodiments, the first lens unit L1 consists of, in order from the object side to the image side, the positive lens G1 and the negative lens G2. A focal length of the first lens unit L1 is represented by f1, a focal length of the third lens unit L3 is represented by f3, a focal length of the negative lens G2 included in the first lens unit L1 is represented by fG2, and a focal length of an entire system of the zoom lens at the wide-angle end is represented by "fw". At this time, the following conditional expressions are satisfied:

$$5.0 < f1/f3 < 12.0 \quad (1); \text{ and}$$

$$-14.0 < fG2/fw < -3.0 \quad (2).$$

Next, technical meanings of the above-mentioned conditional expressions are described. The conditional expression (1) defines a ratio of the focal length of the first lens unit L1 to the focal length of the third lens unit L3. When the ratio exceeds the upper limit of the conditional expression (1), and the focal length of the first lens unit L1 becomes much longer, a movement distance of the first lens unit L1 during zooming becomes larger, and hence a total lens length at the telephoto end becomes longer, with the result that it becomes difficult to downsize the entire system. In contrast, when the ratio falls below the lower limit of the conditional expression (1), and the focal length of the first lens unit L1 becomes much shorter, it becomes difficult to correct spherical aberration, comatic aberration, and other various aberrations.

The conditional expression (2) defines a ratio of the focal length of the negative lens G2 included in the first lens unit L1 to the focal length of the entire system at the wide-angle end. When the ratio falls below the lower limit of the conditional expression (2), and a negative refractive power of the negative lens G2 becomes weaker (absolute value of the negative refractive power becomes smaller), the effect of correcting chromatic aberrations in the first lens unit L1 is reduced. Moreover, when the ratio exceeds the upper limit of the conditional expression (2), and the negative refractive power of the negative lens G2 becomes stronger (absolute value of the negative refractive power becomes larger), it becomes difficult to correct spherical aberration, comatic aberration, and other various aberrations in the first lens unit L1.

It is preferred to set numerical ranges of the conditional expressions (1) and (2) to the following ranges.

$$5.5 < f1/f3 < 11.0 \quad (1a)$$

$$-13.0 < fG2/fw < -3.2 \quad (2a)$$

It is further preferred to set numerical ranges of the conditional expressions (1a) and (2a) to the following ranges.

$$6.0 < f1/f3 < 10.0 \quad (1b)$$

$$-12.0 < fG2/fw < -3.4 \quad (2b)$$

In each of Embodiments, the conditional expressions (1) and (2) are satisfied as described above to obtain a zoom lens that is reduced in weight as the entire system and has high optical performance.

In each of Embodiments, it is preferred to satisfy one or more of conditional expressions provided below. A thickness of the first lens unit L1 (distance on the optical axis from a lens surface closest to the object side in the first lens unit to the lens surface closest to the image side) in an optical axis direction is represented by DL1. A thickness of the negative lens G2 included in the first lens unit L1 in the optical axis direction (distance on the optical axis from the lens surface on the object side to the lens surface on the image side of the negative lens G2) is represented by DG2. An Abbe number of the material of the positive lens G1 included in the first lens unit L1 is represented by vdG1. A refractive index of the material of the negative lens G2 included in the first lens unit L1 is represented by ndG2. Curvature radii of the lens surfaces on the object side and the image side of the negative lens G2 included in the first lens unit L1 are represented by Ra and Rb, respectively. A back focus at the wide-angle end is represented by SKw.

At this time, it is preferred to satisfy one or more of the following conditional expressions.

$$0.05 < DL1/fw < 0.30 \quad (3)$$

$$0.01 < DG2/fw < 0.10 \quad (4)$$

$$60 < vdG1 < 100 \quad (5)$$

$$1.5 < ndG2 < 1.8 \quad (6)$$

$$0.03 < (Ra-Rb)/(Ra+Rb) < 0.55 \quad (7)$$

$$0.5 < SKw/fw < 1.2 \quad (8)$$

Next, technical meanings of the above-mentioned conditional expressions are described. The conditional expression (3) defines a ratio of the thickness on the optical axis of the first lens unit L1 to the focal length of the entire system at the wide-angle end. When the ratio exceeds the upper limit of the conditional expression (3), and a lens unit thickness of the first lens unit L1 becomes much thicker, it becomes difficult to downsize and reduce the weight of the entire system. In contrast, when the ratio falls below the lower limit of the conditional expression (3), and the lens unit thickness of the first lens unit L1 becomes much thinner, it becomes difficult to process the positive lens G1 and the negative lens G2.

The conditional expression (4) defines a ratio of the thickness on the optical axis of the negative lens G2 to the focal length of the entire system at the wide-angle end. When the ratio exceeds the upper limit of the conditional expression (4), and the thickness of the negative lens G2 becomes much thicker, it becomes difficult to downsize and reduce the weight of the entire system. In contrast, when the ratio falls below the lower limit of the conditional expression (4), and the thickness of the negative lens G2 becomes much thinner, it becomes difficult to process the negative lens G2.

The conditional expression (5) relates to the Abbe number of the material of the positive lens G1 in the first lens unit L1. As to chromatic aberrations on a telephoto side, it becomes easier to correct both axial chromatic aberration and chromatic aberration of magnification when low-dispersion glass is used for the positive lens G1 of the first lens unit L1. When the value exceeds the upper limit of the conditional expression (5), the effect of correcting chromatic aberrations in the first lens unit L1 of the positive lens G1 becomes overcorrection. Moreover, when the value falls below the lower limit of the conditional expression (5), the effect of correcting chromatic aberrations in the first lens unit L1 of the positive lens G1 becomes undercorrection.

The conditional expression (6) defines the refractive index of the material of the negative lens G2 in the first lens unit L1. In general, when a refractive index of a material of a lens becomes higher, a specific gravity of the lens becomes higher. When the value exceeds the upper limit of the conditional expression (6), the refractive index of the material of the negative lens G2 becomes much higher, and it becomes difficult to reduce the weight. In contrast, when the value falls below the lower limit of the conditional expression (6), the refractive index of the material of the negative lens G2 becomes much smaller, and the curvatures of the lens surfaces of the negative lens G2 become larger, with the result that it becomes difficult to correct spherical aberration, comatic aberration, and other various aberrations.

The conditional expression (7) defines lens shape factors of the negative lens G2 in the first lens unit L1. The axial beam is significantly refracted on the lens surface on the image side to correct spherical aberration and comatic aberration in the first lens unit L1 in a balanced manner. When the ratio exceeds the upper limit of the conditional expression (7), amounts of spherical aberration, comatic aberration, and other aberrations generated on the lens surface on the image side of the negative lens G2 become larger, and it becomes difficult to correct the aberrations. Moreover, when the ratio falls below the lower limit of the conditional expression (7), the negative refractive power of the negative lens G2 becomes weaker, and it becomes difficult to correct chromatic aberrations in the first lens unit L1.

The conditional expression (8) defines a ratio of the back focus SKw at the wide-angle end to the focal length "fw" of the entire system at the wide-angle end. When the ratio exceeds the upper limit of the conditional expression (8), and the back focus becomes longer, it is required to suppress the refractive powers of the first lens unit L1 and the second lens unit L2, and the total lens length is disadvantageously increased. Moreover, when the ratio falls below the lower limit of the conditional expression (8), the back focus becomes much shorter, and it becomes difficult to arrange a quick return mirror in an exchangeable lens for a single lens reflex camera or other camera.

It is preferred to set numerical ranges of the conditional expressions (3) to (8) to the following ranges.

$$0.06 < DL1/fw < 0.25 \quad (3a)$$

$$0.02 < DG2/fw < 0.09 \quad (4a)$$

$$62 < vdG1 < 98 \quad (5a)$$

$$1.52 < ndG2 < 1.75 \quad (6a)$$

$$0.04 < (Ra-Rb)/(Ra+Rb) < 0.50 \quad (7a)$$

$$0.6 < SKw/fw < 1.1 \quad (8a)$$

It is further preferred to set numerical ranges of the conditional expressions (3a) to (8a) to the following ranges.

$$0.07 < DL1/fw < 0.20 \quad (3b)$$

$$0.03 < DG2/fw < 0.08 \quad (4b)$$

$$63 < vdG1 < 96 \quad (5b)$$

$$1.55 < ndG2 < 1.70 \quad (6b)$$

$$0.05 < (Ra-Rb)/(Ra+Rb) < 0.45 \quad (7b)$$

$$0.65 < SKw/fw < 1.00 \quad (8b)$$

The exemplary embodiments of the present invention are described above, but the present invention is not limited to those embodiments and can be modified and changed variously within the scope of the gist thereof.

Next, a digital still camera (image pickup apparatus) according to an Embodiment of the present invention using the zoom lens of each of Embodiments is described with reference to FIG. 7.

FIG. 7 is a schematic diagram of a main part of a single lens reflex camera (image pickup apparatus). In FIG. 7, an image pickup optical system 10 includes a zoom lens 1 according to any one of Embodiments 1 to 3. The zoom lens 1 is held by a lens barrel 2, which is a holding member. A camera main body 20 consists of a quick return mirror 3, a focusing plate 4, a penta roof prism 5, an eyepiece 6, and other components.

The quick return mirror 3 reflects a beam from the image pickup optical system 10 upward. The focusing plate 4 is arranged at an image forming position of the image pickup optical system 10. The penta roof prism 5 converts an inversed image formed on the focusing plate 4 into an erected image. An observer observes the erected image through the eyepiece 6. On a photosensitive surface 7, a CCD sensor, a CMOS sensor, or other image pickup element (photoelectric conversion element), or a silver-halide film, which is configured to receive the image, is arranged. When an image is taken, the quick return mirror 3 is retracted from an optical path, and the image is formed on the photosensitive surface 7 by the image pickup optical system 10.

As described above, the zoom lens according to each of Embodiments is applied to an exchangeable lens of a single lens reflex camera or other image pickup apparatus to realize an optical instrument having high optical performance. In addition, the zoom lens according to each of Embodiments is also equally applicable to a mirrorless single lens reflex camera without a quick return mirror. Further, the zoom lens according to each of Embodiments is applicable to a telescope, a binocular, a copying machine, a projector, or other optical equipment, as well as a digital camera, a video camera, or a silver-halide film camera, for example.

Next, Numerical Embodiments of Embodiments are provided. In each set of Numerical Embodiment, "i" represents the order of a surface from the object side, "ri" represents a curvature radius of a lens surface, "di" represents a lens thickness and air interval between the i-th surface and the (i+1)-th surface, and "ndi" and "vdi" represent a refractive index and an Abbe number with respect to the d-line, respectively. BF represents a back focus, which is an equivalent air length from the last lens surface to the image plane. The total lens length is a distance obtained by adding the back focus to a distance on the optical axis from the first lens surface to the last lens surface of the zoom lens. An aspherical shape is expressed by the following equation:

$$X = \frac{(1/R)H^2}{1+\sqrt{1-(1+K)(H/R)^2}} + B \times H^4 + C \times H^6 + D \times H^8 + E \times H^{10} + F \times H^{12}$$

where the X axis corresponds to the optical axis direction, the H axis corresponds to the direction perpendicular to the optical axis, the light propagation direction is positive, R represents a paraxial curvature radius, K represents a conic constant, and B, C, D, E, and F, each represent an aspherical coefficient. In addition, [e+X] means $[\times 10^{+X}]$, and [e−X] means $[\times 10^{-X}]$. The aspherical surface is indicated by adding * as a suffix to a surface number. In addition, the part in which an interval "d" between optical surfaces is "(variable)" is changed during zooming, and the interval between surfaces corresponding to the focal length is shown in an annexed table. In addition, a relationship among the parameters, the conditional expressions, and the numerical embodiments are shown in Table 1.

Numerical Embodiment 1

Unit: mm

Surface data

| Surface number | r | d | nd | vd |
|---|---|---|---|---|
| 1 | 75.553 | 2.71 | 1.48749 | 70.2 |
| 2 | 1,380.130 | 0.15 | | |
| 3* | 58.967 | 2.95 | 1.63080 | 23.9 |
| 4* | 46.989 | (Variable) | | |
| 5 | −53.721 | 0.80 | 1.71999 | 50.2 |
| 6 | 28.833 | 2.33 | 2.00069 | 25.5 |
| 7 | 60.400 | (Variable) | | |
| 8 | ∞ | 2.06 | | |
| 9 | 27.645 | 6.31 | 1.49700 | 81.6 |

-continued

Unit: mm

| | | | | |
|---|---|---|---|---|
| 10 | −48.020 | 1.00 | 1.92119 | 24.0 |
| 11 | −115.545 | 9.43 | | |
| 12 (Stop) | ∞ | 0.57 | | |
| 13* | 107.444 | 3.81 | 1.53110 | 55.9 |
| 14* | −139.786 | (Variable) | | |
| 15 | −99.127 | 1.84 | 2.00069 | 25.5 |
| 16 | −34.041 | 2.54 | | |
| 17 | −28.639 | 0.70 | 1.80610 | 33.3 |
| 18 | 528.798 | 4.00 | | |
| 19 | ∞ | (Variable) | | |
| Image plane | ∞ | | | |

Aspherical surface data

Third surface

K = 0.00000e+000   B = −2.70830e−006   C = 1.43692e−009
D = 9.14330e−012   E = −5.40331e−014   F = 1.16225e−016

Fourth surface

K = 0.00000e+000   B = −3.26177e−006   C = 2.14456e−009
D = 7.19662e−012   E = −6.00382e−014   F = 1.56913e−016

Thirteenth surface

K = 0.00000e+000   B = −1.07966e−005   C = 7.74767e−009
D = −2.42652e−010   E = 3.30575e−012   F = −8.72318e−015

Fourteenth surface

K = 0.00000e+000   B = −1.68989e−007   C = 1.44393e−008
D = −1.76479e−010   E = 3.17738e−012   F = −8.64489e−015

Various data
Zoom ratio 3.42

| | Wide angle | Intermediate | Telephoto |
|---|---|---|---|
| Focal length | 56.80 | 120.00 | 193.99 |
| F-number | 4.60 | 6.49 | 6.49 |
| Half angle of view (degrees) | 13.52 | 6.49 | 4.03 |
| | 13.66 | 13.66 | 13.66 |
| Total lens length | 151.51 | 193.35 | 208.01 |
| BF | 53.39 | 77.26 | 77.26 |
| d4 | 4.69 | 46.53 | 61.19 |
| d7 | 43.52 | 18.26 | 1.12 |
| d14 | 12.69 | 14.08 | 31.22 |
| d19 | 49.39 | 73.26 | 73.26 |

Zoom lens unit data

| Unit | First surface | Focal length |
|---|---|---|
| 1 | 1 | 262.06 |
| 2 | 5 | −49.15 |
| 3 | 8 | 42.59 |
| 4 | 15 | −112.32 |

Numerical Embodiment 2

Unit: mm

Surface data

| Surface number | r | d | nd | vd |
|---|---|---|---|---|
| 1 | 30.751 | 2.87 | 1.43875 | 94.7 |
| 2 | 41.624 | 0.15 | | |
| 3* | 36.635 | 1.98 | 1.60209 | 27.0 |
| 4* | 32.586 | (Variable) | | |
| 5 | −58.633 | 0.80 | 1.77250 | 49.6 |
| 6 | 36.359 | 2.34 | 2.00069 | 25.5 |
| 7 | 91.649 | (Variable) | | |

-continued

Unit: mm

| | | | | |
|---|---|---|---|---|
| 8 | ∞ | 2.20 | | |
| 9 | 28.745 | 6.36 | 1.49700 | 81.5 |
| 10 | −60.396 | 1.00 | 2.00272 | 19.3 |
| 11 | −121.420 | 11.26 | | |
| 12 (Stop) | ∞ | 0.10 | | |
| 13* | 23.893 | 2.57 | 1.53110 | 55.9 |
| 14* | 36.366 | (Variable) | | |
| 15 | −1,434.859 | 1.60 | 2.00069 | 25.5 |
| 16 | −37.229 | 1.83 | | |
| 17 | −30.189 | 0.70 | 1.80610 | 33.3 |
| 18 | 64.188 | 4.00 | | |
| 19 | ∞ | (Variable) | | |
| Image plane | ∞ | | | |

Aspherical surface data

Third surface

K = 0.00000e+000   B = 1.49527e−005   C = 2.03514e−008
D = −1.19928e−010   E = 3.74233e−013   F = −3.03486e−016

Fourth surface

K = 0.00000e+000   B = 1.75410e−005   C = 2.96142e−008
D = −1.50998e−010   E = 4.99115e−013   F = −3.21362e−016

Thirteenth surface

K = 0.00000e+000   B = 2.91043e−005   C = 1.74713e−007
D = −3.10705e−010   E = 3.27734e−012   F = 4.95261e−015

Fourteenth surface

K = 0.00000e+000   B = 4.95170e−005   C = 2.29269e−007
D = −3.51186e−010   E = 4.65228e−012   F = 9.88556e−015

Various data
Zoom ratio 3.41

| | Wide angle | Intermediate | Telephoto |
|---|---|---|---|
| Focal length | 56.81 | 120.00 | 193.97 |
| F-number | 4.28 | 6.49 | 6.49 |
| Half angle of view (degrees) | 13.52 | 6.49 | 4.03 |
| Image height | 13.66 | 13.66 | 13.66 |
| Total lens length | 153.04 | 192.66 | 209.56 |
| BF | 47.99 | 74.70 | 74.68 |
| d4 | 6.61 | 46.23 | 63.12 |
| d7 | 48.16 | 19.13 | 0.89 |
| d14 | 14.53 | 16.85 | 35.11 |
| d19 | 43.99 | 70.70 | 70.68 |

Zoom lens unit data

| Unit | First surface | Focal length |
|---|---|---|
| 1 | 1 | 400.00 |
| 2 | 5 | −55.76 |
| 3 | 8 | 42.55 |
| 4 | 15 | −89.27 |

Numerical Embodiment 3

Unit: mm

Surface data

| Surface number | r | d | nd | vd |
|---|---|---|---|---|
| 1 | 42.189 | 3.17 | 1.51633 | 64.1 |
| 2 | 93.641 | 0.50 | | |
| 3* | 24.228 | 3.80 | 1.63080 | 23.9 |
| 4* | 19.092 | (Variable) | | |
| 5 | −50.329 | 0.80 | 1.63930 | 44.9 |

-continued

Unit: mm

| | | | | |
|---|---|---|---|---|
| 6 | 29.007 | 2.47 | 1.85896 | 22.7 |
| 7 | 65.284 | (Variable) | | |
| 8 | ∞ | 2.06 | | |
| 9 | 26.399 | 6.74 | 1.43875 | 94.7 |
| 10 | −43.395 | 1.00 | 2.00069 | 25.5 |
| 11 | −75.016 | 6.77 | | |
| 12 (Stop) | ∞ | 8.16 | | |
| 13* | 15.967 | 2.69 | 1.53110 | 55.9 |
| 14* | 20.358 | (Variable) | | |
| 15 | 62.339 | 2.34 | 1.54814 | 45.8 |
| 16 | −30.778 | 1.94 | | |
| 17 | −28.490 | 0.70 | 1.72916 | 54.7 |
| 18 | 48.998 | 1.00 | | |
| 19 | ∞ | (Variable) | | |
| Image plane | ∞ | | | |

Aspherical surface data

Third surface

K = 0.00000e+000   B = −8.96996e−006   C = −3.38935e−009
D = −3.62223e−011  E = 4.21963e−014    F = 4.48442e−017

Fourth surface

K = 0.00000e+000   B = −1.50408e−005   C = −1.42825e−008
D = −1.19349e−010  E = 1.98356e−013    F = −4.94196e−016

Thirteenth surface

K = 0.00000e+000   B = 3.42631e−005    C = 2.75004e−007
D = −1.21120e−009  E = 1.52389e−011    F = −1.40085e−014

Fourteenth surface

K = 0.00000e+000   B = 7.05169e−005    C = 4.49523e−007
D = −1.85681e−009  E = 2.99457e−011    F = −4.20092e−014

Various data
Zoom ratio 3.41

| | Wide angle | Intermediate | Telephoto |
|---|---|---|---|
| Focal length | 56.81 | 120.00 | 193.99 |
| F-number | 4.08 | 6.49 | 6.49 |
| Half angle of view (degrees) | 13.52 | 6.49 | 4.03 |
| Image height | 13.66 | 13.66 | 13.66 |
| Total lens length | 153.02 | 183.48 | 202.84 |
| BF | 42.17 | 69.57 | 69.54 |
| d4 | 7.37 | 37.82 | 57.18 |
| d7 | 47.72 | 18.82 | 1.12 |
| d14 | 12.61 | 14.11 | 31.85 |
| d19 | 41.17 | 68.57 | 68.54 |

Zoom lens unit data

| Unit | First surface | Focal length |
|---|---|---|
| 1 | 1 | 393.73 |
| 2 | 5 | −54.32 |
| 3 | 8 | 42.51 |
| 4 | 15 | −87.06 |

TABLE 1

| | Numerical Embodiment | | |
|---|---|---|---|
| Conditional Expression | 1 | 2 | 3 |
| (1) | 6.2 | 9.4 | 9.3 |
| (2) | −7.1 | −10.6 | −3.5 |
| (3) | 0.10 | 0.09 | 0.13 |
| (4) | 0.05 | 0.035 | 0.07 |
| (5) | 70.2 | 94.7 | 64.1 |
| (6) | 1.631 | 1.602 | 1.631 |
| (7) | 0.12 | 0.06 | 0.11 |
| (8) | 0.94 | 0.84 | 0.74 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-225560, filed Nov. 24, 2017, which is hereby incorporated by reference herein in its entirety.

What is claimed is:

1. A zoom lens comprising, in order from an object side to an image side:

a first lens unit having a positive refractive power;

a second lens unit having a negative refractive power; and a third lens unit having a positive refractive power, wherein an interval between each pair of adjacent lens units is changed during zooming, wherein the first lens unit consists of a positive lens and a negative lens arranged on the image side of the positive lens, wherein the following conditional expressions are satisfied:

$$5.0 < f1/f3 < 12.0; \text{ and}$$

$$-14.0 < fG2/fw < -3.0,$$

where f1 represents a focal length of the first lens unit, f3 represents a focal length of the third lens unit, fG2 represents a focal length of the negative lens, and fw represents a focal length of an entire system of the zoom lens at a wide-angle end.

2. The zoom lens according to claim 1, wherein the following conditional expression is satisfied:

$$0.05 < DL1/fw < 0.30,$$

where DL1 represents a thickness of the first lens unit in an optical axis direction.

3. The zoom lens according to claim 1, wherein the following conditional expression is satisfied:

$$0.01 < DG2/fw < 0.10,$$

where DG2 represents a thickness of the negative lens in an optical axis direction.

4. The zoom lens according to claim 1, wherein the following conditional expression is satisfied:

$$60 < vdG1 < 100,$$

where vdG1 represents an Abbe number of a material of the positive lens included in the first lens unit.

5. The zoom lens according to claim 1, wherein the following conditional expression is satisfied:

$$1.5 < ndG2 < 1.8,$$

where ndG2 represents a refractive index of a material of the negative lens.

6. The zoom lens according to claim 1, wherein the following conditional expression is satisfied:

$$0.03 < (Ra-Rb)/(Ra+Rb) < 0.55,$$

where Ra and Rb respectively represent curvature radii of lens surfaces on the object side and the image side of the negative lens.

7. The zoom lens according to claim 1, wherein the following conditional expression is satisfied:

$$0.5 < SKw/fw < 1.2,$$

where SKw represents a back focus at the wide-angle end.

8. The zoom lens according to claim 1, further comprising a fourth lens unit having a negative refractive power, which is arranged adjacent to the third lens unit on the image side of the third lens unit.

9. The zoom lens according to claim 1, wherein the second lens unit consists two or less lenses.

10. The zoom lens according to claim 1, wherein the third lens unit consists of three or less lenses.

11. The zoom lens according to claim 1, wherein the negative lens is formed of a resin material.

12. The zoom lens according to claim 1, wherein the negative lens has an aspherical surface as at least one of a lens surface on the object side or a lens surface on the image side.

13. The zoom lens according to claim 1, wherein the third lens unit has an aspherical surface as at least one of a lens surface on the object side or a lens surface on the image side.

14. The zoom lens according to claim 1,
wherein the zoom lens consists of, in order from the object side to the image side:
the first lens unit having the positive refractive power;
the second lens unit having the negative refractive power;
the third lens unit having the positive refractive power; and
a fourth lens unit having a negative refractive power, and
wherein the first lens unit, the third lens unit, and the fourth lens unit are configured to move toward the object side, and the second lens unit is configured not to move during zooming from the wide-angle end to a telephoto end.

15. The zoom lens according to claim 1, wherein the third lens unit includes an aperture stop configured to move integrally with the third lens unit during zooming.

16. An image pickup apparatus comprising:
a zoom lens; and
an image pickup element configured to receive an image formed by the zoom lens,
the zoom lens including, in order from an object side to an image side:
a first lens unit having a positive refractive power;
a second lens unit having a negative refractive power; and
a third lens unit having a positive refractive power,
wherein an interval between each pair of adjacent lens units is changed during zooming,
wherein the first lens unit consists of a positive lens and a negative lens arranged on the image side of the positive lens,
wherein the following conditional expressions are satisfied:

$$5.0 < f1/f3 < 12.0; \text{ and}$$

$$-14.0 < fG2/fw < -3.0,$$

where f1 represents a focal length of the first lens unit, f3 represents a focal length of the third lens unit, fG2 represents a focal length of the negative lens, and fw represents a focal length of an entire system of the zoom lens at a wide-angle end.

* * * * *